Feb. 16, 1960 A. W. KLOMP 2,924,910
GEAR BORE AND TOOTH-FLANK CONCENTRICIZING MACHINE
Filed Aug. 16, 1955 7 Sheets-Sheet 1

Fig.1

INVENTOR.
ALFRED W. KLOMP
BY
ATTORNEYS

Feb. 16, 1960 A. W. KLOMP 2,924,910
GEAR BORE AND TOOTH-FLANK CONCENTRICIZING MACHINE
Filed Aug. 16, 1955 7 Sheets-Sheet 6

INVENTOR.
ALFRED W. KLOMP
BY
ATTORNEYS

United States Patent Office 2,924,910
Patented Feb. 16, 1960

2,924,910

GEAR BORE AND TOOTH-FLANK CONCEN-
TRICIZING MACHINE

Alfred W. Klomp, Detroit, Mich., assignor to Process
Gear & Machine Company, Detroit, Mich., a corpo-
ration of Michigan Application August 16, 1955, Serial No. 528,748

23 Claims. (Cl. 51—3)

This invention relates to a process and apparatus for machining workpieces, and more particularly to finish machining gears, within specified tolerances of size, and still more particularly to accurately concentricize the gear bore and tooth-flanks of a gear in one operation, although other uses and purposes may be apparent to one skilled in the art.

The present invention performs machining operations on a workpiece gear in a (so called) centerless manner, and generally includes a plurality of radially aligned machining wheels having parallel axes, a floating arbor loaded with an abrasive extending between the axes of said wheels, and an automatic gear feed mechanism and arbor abrasive expanding mechanism. While the machining operation may be limited to the center bore or tooth-flanks of a gear, generally these operations will be performed simultaneously. Moreover, depending upon the manner in which the finishing machine of the invention is set-up, the machining may be selectively arranged to grind, hone, or lap a workpiece such as a gear.

In connection with machining gears, no machine has been developed in the past for simultaneously performing machining operations on the bore and tooth-flanks of a gear. Moreover, it has not been heretofore possible to machine a gear and bring the center bore into absolute concentric relationship with the pitch circle of the teeth. Even the heretofore known centerless type machining devices could not accomplish the desired machining of a workpiece in a single operation. In some cases, as many as five succesive machines were necessary to properly machine a workpiece, each reducing the eccentricity slightly more than the preceeding one.

With the foregoing in mind, it is an important object of the instant invention to provide an apparatus for simultaneously performing a plurality of machining operations on a workpiece.

It is also an object of this invention to provide a machining apparatus of the centerless type capable of accomplishing a desired result in a single operation, such as machining the center bore and pitch circle of a gear into concentric relationship to a degree heretofore not accomplished in a number of operations.

Another feature of this invention resides in the provision of a machining apparatus for simultaneously performing machining operations on the bore and tooth-flanks of a gear.

Still another feature of this invention is to provide a machining apparatus which is capable of bringing the center bore of a gear into absolute concentric relationship with the pitch circle of the gear, in a single operation.

Another object of this invention is to provide a machining apparatus capable of selectively performing grinding, honing, or lapping operations on the center bore and tooth-flanks of a gear workpiece simultaneously.

Another object of this invention resides in the provision of a machining apparatus equipped with a feeding mechanism capable of automatically feeding a gear workpiece thereto at predetermined intervals.

A further feature of the invention is to provide a machine for concentricizing the gear bore and tooth-flanks of a gear equipped with electro-hydraulic controls for automatically operating the machine.

Another feature of this invention is to provide a machining apparatus for concentricizing the center bore and the tooth-flanks of a gear workpiece comprising a plurality of machining wheels having parallel axes, an abrasive carrying arbor extending between the axes of the wheels, a mechanism for automatically feeding a gear to the arbor at predetermined intervals, and a mechanism for intermittently expanding the abrasive along the arbor, wherein the machining wheels function to machine the tooth-flanks of a gear workpiece supported by the arbor, and rotate the workpiece about the arbor and advance it therealong thereby simultaneously causing the abrasive loaded arbor to perform a machining operation on the center bore of the gear workpiece.

It is a still further object of this invention to provide an apparatus for machining the center bore and tooth-flanks of a gear or the like simultaneously, the apparatus being capable of acting on a plurality of continuously moving workpieces at one time.

And another object of the invention is the provision of a center bore finishing machine utilizing abrasives and automatically disposing of used abrasive material.

Still another feature of the invention is to provide a new and novel method for concentricizing the center bore and pitch circle of a gear workpiece.

Still another feature of this invention is to provide a new method of simultaneously machining the center bore and tooth-flanks of a gear to concentricize the center bore with the pitch circle thereof.

While some of the more salient features, characteristics and advantages of the instant invention have been above pointed out, others will become apparent from the following disclosures, taken in conjunction with the accompanying drawings, in which:

The machine in general

The instant invention is primarily useful in performing machining operations on workpieces. Depending upon the set-up of the machine, grinding, honing lapping or the like may be performed on the workpieces. The present invention is especially useful in simultaneously machining the gear bore and tooth flanks of a gear workpiece, although it may be selectively operated to machine only the gear bore or only the tooth-flanks of a gear. In all cases, an important objective is to concentricize the pitch circle, which is generally defined by the tooth-flanks, with the gear bore. While the present invention herein disclosed will be described in connection with machining gear workpieces, it is to be understood that the invention will also be capable of machining other workpieces.

Figure 1:
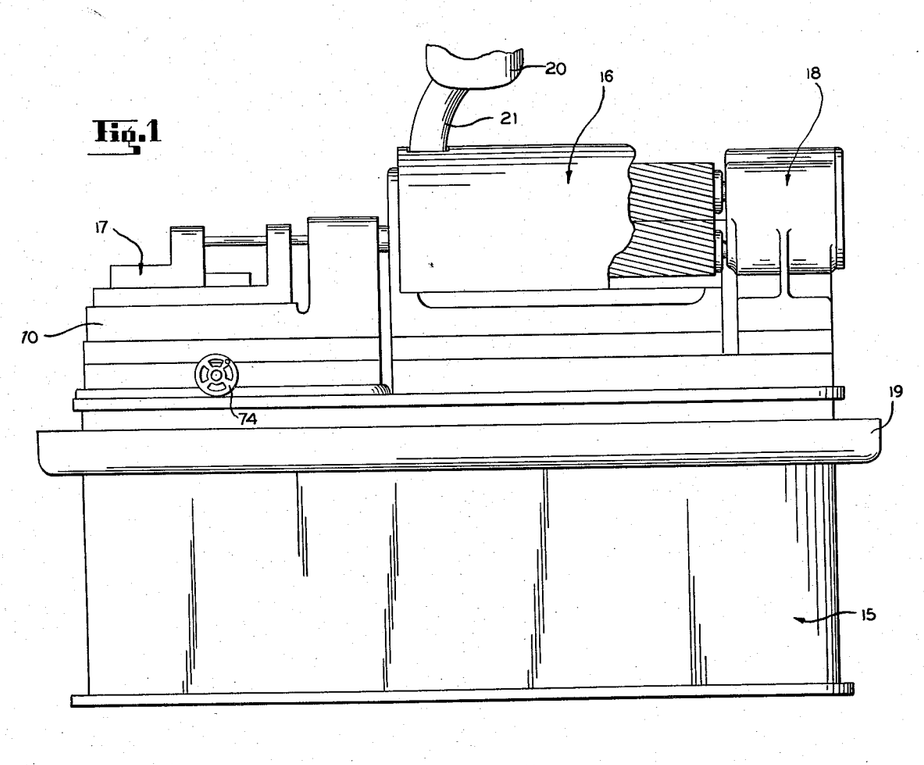
Figure 1 is a partially fragmentary side elevational view, with parts broken away, of a machining apparatus embodying principles of the instant invention.

The machining apparatus in accordance with the instant invention, as seen in Figure 1, includes generally an elongated floor-supported base 15, a machining mechanism 16 mounted on said base, a workpiece feed unit 17 movably supported on said base for feeding workpieces to the machining mechanism, and an ejection or discharge assembly 18 for receiving finished workpieces from the machining mechanism 16 and discharging them from the machining apparatus. A trough 19 is rigidly fastened to the base 15 near the top thereof and completely surrounds the base for catching and collecting any coolant that might be used by the machining mechanism 16. Although not shown, it is understood that the coolant may then be filtered and recirculated to the machining mechanism by a conventional pump and filtering system. This system, along with other operating motors for the machining apparatus may be enclosed within the base 15 if desired. A hopper or magazine 20 is adjustably supported in overlying relationship to the machining mechanism 16 and is provided with a chute 21 to deliver workpieces to a machining mechanism in a manner to be hereinafter more fully disclosed and discussed.

Machining mechanism

Figures 7, 8:
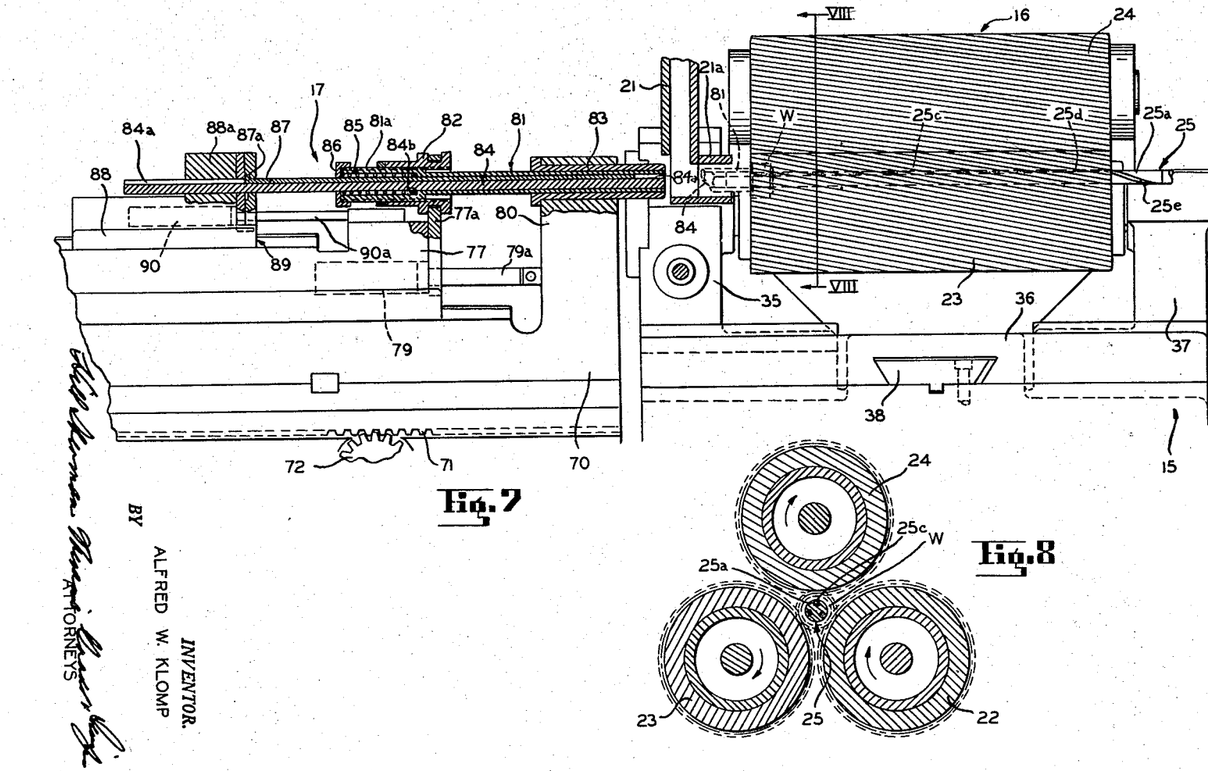
Figure 7 is a fragmentary enlarged side elevation view of the machining apparatus of Figure 1 with parts in section and some parts removed.
Figure 8 is an enlarged transverse cross sectional view of the machine wheels, taken substantially along line VIII—VIII of Figure 7.

Referring now more particularly to Figures 2, 3, 4, 7 and 8, the machining mechanism 16 is provided with three elongated coacting machining wheels, although it is understood that a greater or lesser number of wheels may be employed if so desired. The wheels are rotatably supported along parallel axes which axes as seen in Fig. 8 are preferably at the apices of a transverse equilateral triangle. The two lower wheels 22 and 23 are driven, while the upper wheel 24 is mounted as an idler.

Figure 2:
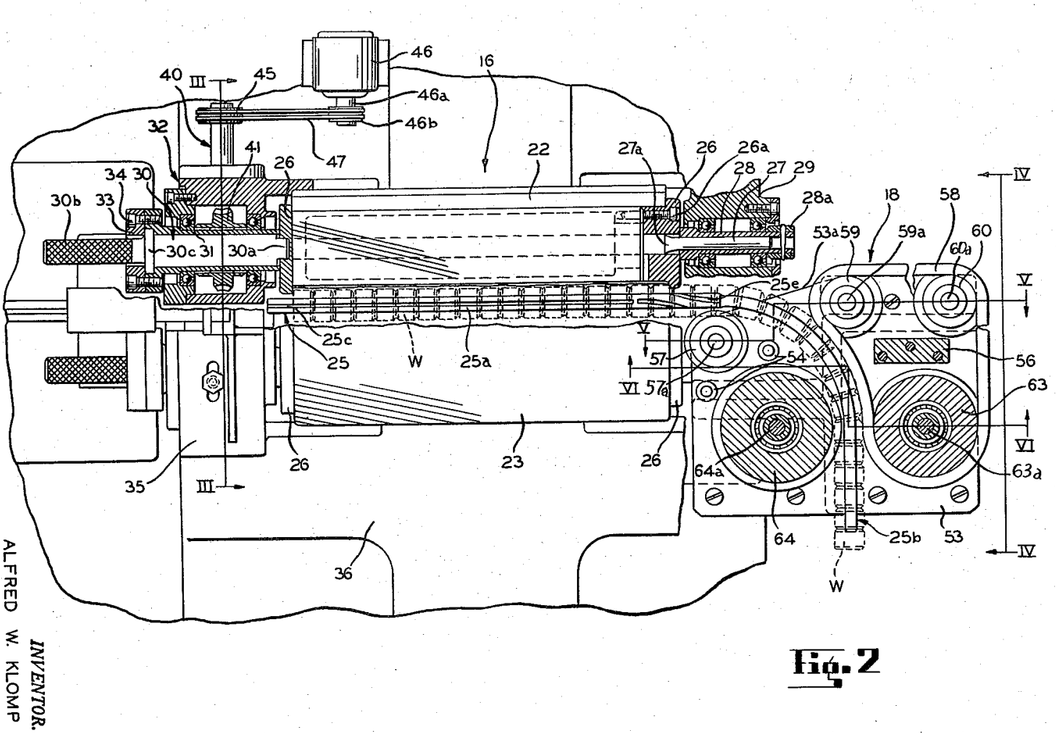
Figure 2 is an enlarged fragmentary plan view of a detailed portion of the invention, with parts broken away to show underlying parts and parts shown in section.

As shown in Figures 1, 2 and 7, the machining wheels are spirally toothed in the form of gears in such a manner as to provide teeth which enter between adjacent teeth on a gear workpiece W to machine the tooth-flanks thereof, and to rotate the workpiece gears around a machining arbor 25 and advance them therealong. The teeth on the machining wheels, which allow the wheels to act as feed gears, thrust the workpiece from the input end to the output end.

The machining center tool or floating arbor, generally indicated by the numeral 25, includes a straight machining section 25a extending between the axes of the machining wheels and protruding slightly from the ends of the wheels and a curved section 25b (Figure 2) continuing from the input end of the machining section 25a and through the ejector assembly 18. Workpieces are received on the input end of the arbor from the feeding mechanism 17, as will be more clearly explained hereinafter, and are rotated about the arbor and advanced therealong by the machining wheels 22, 23 and 24.

A plurality of circumferentially spaced and longitudinally extending grooves 25c, in this instance numbering three, are provided along the machining section 25a of the arbor extending from the input end thereof to a point just short of the end of the machining section, as seen most clearly in Figures 2 and 8. The grooves open into the input end of the machining section 25a at a predetermined depth which gradually decreases until the bottom of the groove substantially coincides with the outer surface of the arbor at the terminating point, as indicated by the numeral 25d of Figure 7. Sticks or suitable lengths of abrasive of such a predetermined cross sectional size as to be received in the arbor grooves 25c, are manually inserted in the grooves at the input end of the machining arbor section 25a. The feed mechanism 17, as will be more clearly hereinafter explained, intermittently advances the abrasive along the inclined grooves 25c to in effect expand the abrasive therein, automatically making allowances for wear, to enable uniform machining action to take place with respect to the bores of the workpieces W as the workpieces are advanced along the arbor 25. The expansion of the abrasive or abrading element causes wear of the element to a crumbling thickness and exodus in the flood of coolant. A spiral groove 25e extends substantially from each of the abrasive grooves 25c to the end of the machining section 25a of the arbor 25 to aid in carrying away the coolant and the abrasive, now in more or less fluid state, from the machining section of the arbor.

Depending upon the type of machining operation desired, the abrasive received in the abrasive grooves 25c may be of any suitable type such as a vitrified or bonded abrasive.

Likewise, the machining wheels 22, 23 and 24 may be selectively replaced to accommodate different types of machining operations. Where it is only desired to machine the gear bore or workpiece bore, the wheels may be of high speed steel, hardened and ground to function as guides or in other cases as burnishers or shaving tools, while the arbor 25 may be in the form of a reaming tool. In some cases, the wheels may be of an abrasive to function as grinding wheels.

As honing as well known to the art, the machining wheels could be of solid molded abrasive while the inner machining arbor 25 carries in its grooves 25c a vitrified or bonded abrasive.

Or as lapping is recognized in the art, the machining wheels may be of cast iron, bronze, or other suitable material as would be conducive to impregnation with an abrasive. Generally, the abrasive would not be filtered out of the coolant, thereby employing the coolant to aid the machining wheels particularly if they are of cast iron. However, when the workpiece bores only are to be finished, hardened steel rolls and a clean coolant would be used.

Inasmuch as it is herein contemplated that the machining wheels 22, 23 and 24 may be selectively substituted according to the desired machining operation, the wheels are mounted for easy removal from their supporting frame.

Each of the lower rollers 22 and 23 are provided with opposite end supporting caps 26, 26, as seen in Figure 2, which removably support the respective roll by a plurality of fasteners, such as stud bolts or the like, one of which is shown and indicated by the numeral 26a. The lower machining wheel 22 is supported at its output end by a stub shaft 27 having an inner flared portion 27a slidably received by a centrally disposed aperture in the end cap 26. A major portion of the stub shaft 27 is slidably received within a bushing 28. The bushing 28 is enlarged at one end to abut against the machining wheel cap 26, and is rotatably journaled by a pair of spaced bearings held in a stationary upstanding bearing box 29. A retainer ring 28a is received on the outer end of the bushing 28 and is secured thereto by suitable fastening means such as a transverse pin. The retainer ring 28a coacts with the enlarged end of the bushing 28 to abut against the corresponding adjacent bearings and prevent axial movement of the shaft 27 and bushing 28 with respect to the bearing box 29.

The opposite end of the machining wheel 22 is supported and driven by a driving stub shaft 30 having a flatted portion 30a received in a transversely extending slot in the corresponding end cap 26. The stub shaft 30 is connected to the stub shaft 27 by an intermediate shaft portion extending through the center of the wheel 22. Thus, the stub shafts 27 and 30 are integral. Opposite the flatted end 30a of the shaft 30 is a knurled handle 30b. A radial flange 30c is disposed intermediate the ends of the shaft 30 to abut on one side against a flanged bushing 31 which surrounds the main body of the shaft 30. The bushing 31 is, in turn, journaled by a pair of spaced bearings held in the drive gear bushing 32. A locking ring 33 abuts the outside of the radial flange 30c to coact with the flanged bushing 31 and provide a frictional drive therebetween when the ring 33 is tightened against the bushing of the flange 31 by a plurality of fasteners such as stud bolts 34. Moreover, this frictional connection provides easy adjustment for meshing and calibrating the wheels with the initial workpiece. It is only necessary to lossen the bolts 34, adjust the particular wheel by hand, and tighten the bolts. And, to remove the machining wheel 22 from its mounting, it is only necessary to remove the tightening bolts 34 and locking ring 33 before pulling stub shaft 27a and the drive shaft 30 out of engagement with the corresponding end cap 26 of the wheel 22. Then it is only necessary to lift the machine wheel 22 upward and out.

While only the detailed mounting of the machining wheel 22 is shown, it is to be understood that the machining wheels 23 and 24 are likewise similarly mounted for easy removal in case substitution thereof is desired.

The machining wheel 23 is supported at its drive end by a gear housing 35 similarly shaped to the gear housing 32, but being attached to and supported by a slidable base member 36. The base member 36 extends along the wheel 23 and, as seen in Figure 7, mounts a bearing box 37 in which is rotatably journaled the other end of the shaft of wheel 23. The base member 36 is dovetailed to the main supporting base 15 as indicated by the numeral 38 which permits lateral movement of the machining wheel 23 to accommodate different sizes of workpiece gears to be machined in the illustrated embodiment of the instant invention. Any suitable means may be employed to lock the supporting base member 36 with the main base 15 after the proper adjustment of the wheel 23 has been made, such as a suitable stud or set screw.

The upper or top machining wheel 24 is bearingly supported at its opposite ends by a pair of spaced arm members 39 (see Fig. 4 where only one is shown) which are in turn pivotally supported at 39a to a pair of corresponding upright supporting members 39b. Thus, pivotal adjustment of the upper roll 24 is provided to accommodate different sizes of workpiece gears as is the adjustability of the lower machining wheel 23.

It may be noted that the upper gear wheel 24 functions as an idler or non-driven machining wheel, while the lower wheels 22 and 23 are suitably driven through a gearing mechanism by a suitable prime mover.

Figure 3:
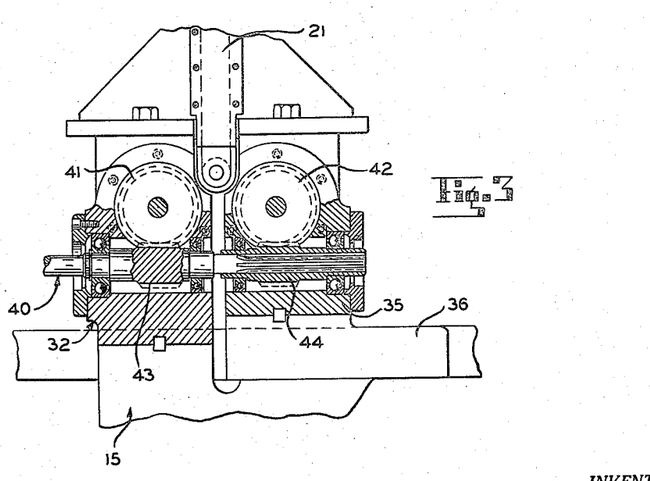
Figure 3 is an enlarged fragmentary cross sectional view, with some parts broken away to show underlying parts, taken substantially along line III—III of Figure 2.
Figure 4:
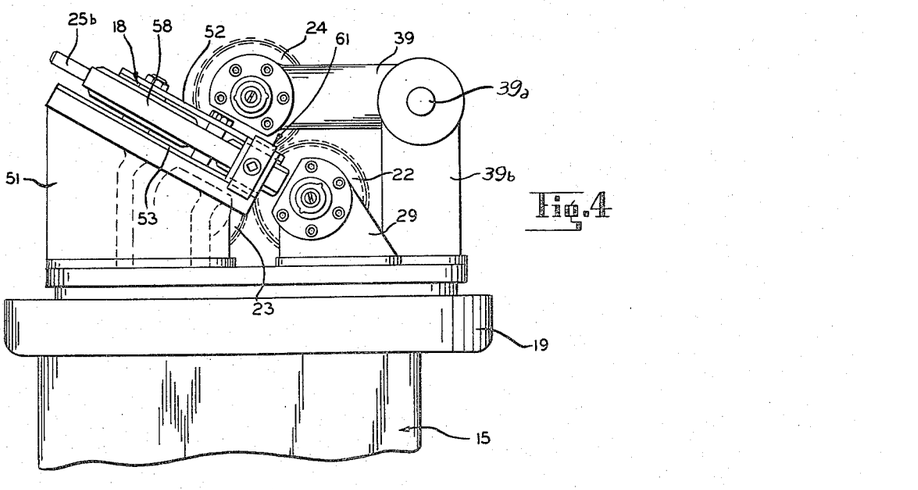
Figure 4 is a fragmentary end elevational view of the machining apparatus in accordance with the invention looking in the direction of the arrows of line IV—IV of Figure 2.
Figure 5:
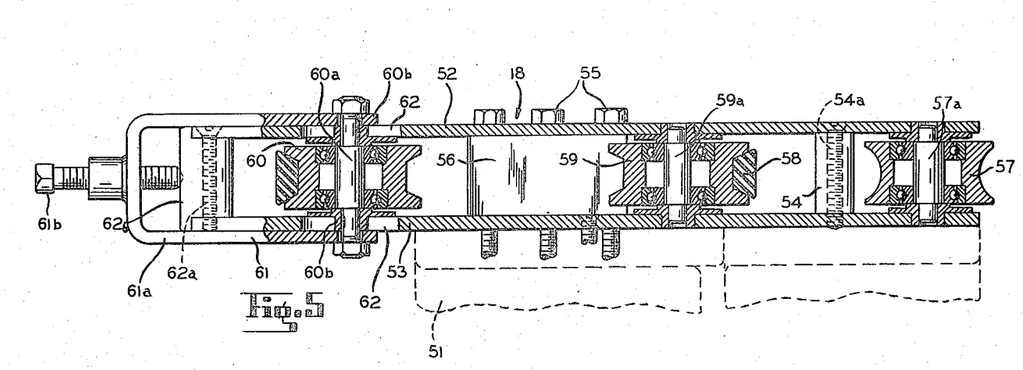
Figure 5 is a greatly enlarged detailed sectional view, with parts in elevation, taken substantially along the staggered section line V—V of Figure 2.
Figure 6:
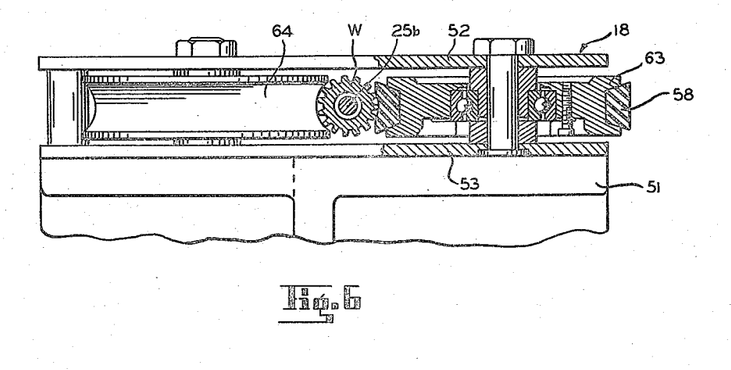
Figure 6 is an enlarged sectional view of a detailed portion of the machining appartus, with parts in elevation, taken substantially along the staggered section line VI—VI of Figure 2.

Referring now generally to Figures 2 and 3, a drive shaft, generally indicated by the numeral 40, extends transversely to the machining wheel axes and is rotatably supported in gear housings 32 and 35 by a plurality of axially spaced bearing members. A worm wheel 41 is suitably fastened, such as by keying, to the drive bushing 31 which is frictionally connected to the end supporting shaft 30 of the machining wheel 22. A worm wheel 42 is similarly drivingly connected to the other lower machining wheel 23. A first worm 43 is fastened to the drive shaft 40 and in meshing engagement with the worm wheel 41 of machining wheel 22, while a second worm wheel 44 is connected to the shaft 40 and in meshing engagement with the worm wheel 42 of the other machining wheel 23. To permit lateral movement of the machining wheel 23 and to maintain the supply of driving power thereto, the worm 44 is spline connected to the shaft 40.

At the input end of the drive shaft 40, a double grooved pulley 45 is carried which is drivingly connected to a pulley 46b on shaft 46a of a drive motor 46 through a double strand belt 47.

Ejection assembly

Referring particularly now to Figures 2, 4, 5 and 6, it is seen that the ejector assembly 18, is rigidly supported at a slight angle with respect to the horizontal axis of the machining apparatus and supported by an upstanding member 51 by any suitable means. The ejection assembly includes a pair of substantially rectangular plate members 52 and 53 having a portion removed from one corner thereof to provide clearance from other machine components, as indicated by the numeral 53a in Figure 2 with respect the bottom plate 53. The plates are spaced in parallel by a plurality of spacer members, such as indicated by the numeral 54 which are held in place with screws 54a coacting with the plate members. A plurality of fasteners, such as bolts indicated by the numeral 55 extend through both plate members and an intermediate rectangularly shaped spacer member 56 to be received in the supporting base 51 for rigidly securing the ejection assembly in proper position.

As the workpieces W leave the machining section 25a of the floating arbor 25, they are engaged by a freely rotating guide roller 57 supported on a shaft 57a extending between the plate members 52 and 53. The workpieces then are advanced along the curved arbor section 25b of lesser diameter which extends between the supporting plates 52 and 53 of the ejection assembly.

As the workpiece is advanced around the curved portion of the arbor it then engages a cushion guide belt 58. The belt 58 is substantially trapezoidal in cross sectional area, although it may be some other desirable and suitable shape and is trained around a plurality of freely rotatable sheaves or pulleys having their axes substantially triangularly arranged. In this instance, three pulleys are employed, two of which are substantially identical in size, while the third pulley is materially larger. One of the small pulleys 59 is stationarily supported on a shaft 59a between the plate members, while the other small pulley 60 is rotatably mounted on a shaft 60a that is adjustably movable toward and away from stationary pulley 59 by a conventional belt tensioner, indicated generally by the numeral 61, and as seen most clearly in Figure 5.

The shaft 60a of the pulley 60 is provided at opposite sides of the pulley with guide bushings 60b—60b having a portion protruding in oppositely aligned slots 62—62 of the upper and lower plate members. A yoke member 61a is slidably received over the ends of the plate members to be secured to the pulley shaft 60a. A threaded bolt 61b is received in the bight portion of the yoke member 61a to abut against an abutment member 62b that is suitably held by the upper and lower plate members, such as by a screw bolt 62a. Thus, the tension of the belt 58 may be suitably adjusted by the tensioner 61 by the manipulation of the adjusting bolt 61b moving the shaft 60a in or out as desired.

The third and largest belt supporting pulley is indicated by the numeral 63, and is similarly rotatably mounted by anti-friction bearings on a shaft 63a between the upper and lower supporting plate members 52 and 53. All of the belt pulleys are annularly grooved to complementarily receive the trapezoidal shaped belt 58. The pulleys 59 and 63 are so positioned as to be substantially equally spaced from the directly adjacent points on the curved arbor section 25b. Then, the belt reach between these pulleys provides a pressurized contact with the workpiece gears on the corresponding portion of the curved arbor section 25b.

Coacting with the stationary pulley 63 to aid in maintaining the workpieces on the arbor section in engagement with the guide belt 58 is a freely rotatably guide roller 64 of substantially the same diametral size as pulley 63. The guide member 64 is similarly sandwiched between the upper and lower plate members 52 and 53 and supported by a corresponding shaft 64a. Both guide rollers 57 and 64 are provided with concave annular surfaces for intimately and accurately engaging a portion of the peripheral workpiece gear surface, as shown most clearly in Figure 6.

Hence, it is seen that the ejector assembly 18 provides a controlled guide for the floating arbor 25 in resisting any thrust forces applied to the machining section 25a of the arbor, and further functions to discharge the workpieces W from the machining operation in an orderly and continuous manner without disturbing the machining action of the arbor. The guide members 57 and 64 and the guide belt 58 are in a sense driven by the advancing gear workpieces W, that is, no positive driving force is transmitted to these members. However, under some conditions, it may be desirable to have the belt 58 driven independently of the effort of the workpieces W if more forceful ejection of the workpieces is desired.

When initially starting the machining apparatus, set-up gears are employed to properly position the floating arbor in working relationship with the machining mechanism 16 and the ejection assembly 18, and these gears are saved and repeatedly reused for the same purpose.

Workpiece feed unit

At predetermined intervals, the workpiece feed unit 17 feeds a single workpiece onto the input end of the machining arbor 25, and advances the abrading element along the grooves or channels 25c of the arbor. After the machine has been initially started, this operation is carried on automatically by an electro-hydraulic controlling arrangement.

Figure 9:
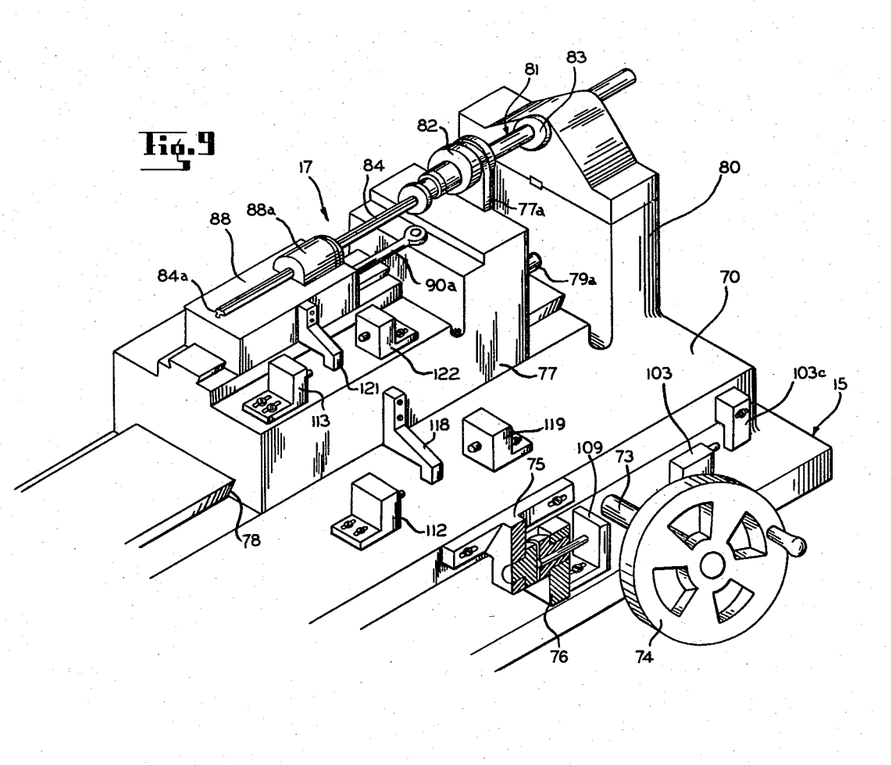
Figure 9 is a fragmentary perspective view of the gear and abrasive feeding mechanism in accordance with the invention.

Referring now particularly to Figures 7 and 9, it is seen that the feed unit is generally supported by a main slide 70 mounted for reciprocating movement on the base 15. The slide 70 reciprocates along the longitudinal axis of the machining apparatus and along a path parallel to the machining section 25a of the floating arbor 25. The slide 70 is maintained in precise position with respect to the base 15 by a conventional dovetail slide arrangement, and is manually reciprocated by a simple rack and pinion mechanism, wherein the rack gear extends along the longitudinal axis of the slide, as indicated by the numeral 71 and engages a pinion gear 72 secured to shaft 73 which extends transversely of the slide. The free end of the shaft 73 carries a hand wheel 74 for manipulation thereof.

In advancing the main slide into operative position, an abutment member 75 adjustably attached to the slide engages an abutment member 76 mounted on the base 15 to provide a stop block arrangement. The abutment members 75 and 76 are adjustably secured to their corresponding mounting members so that a variance in operating position of the slide 70 may be attained.

For feeding the workpiece gears to the arbor 25, a workpiece feed slide 77 is provided that is slidably mounted on the main slide 70 by a conventional dovetain slide arrangement, as indicated by the numeral 78. The position of the workpiece feed slide 77 with respect to the main slide 70 is controlled by a double acting hydraulic cylinder 79 (Figure 7) secured within the slide 77 and having a piston rod 79a attached to an upstanding portion 80 of the slide 70.

A workpiece feed tube 81 is provided with an enlarged cylindrical threaded portion 81a at one end thereof which is threadedly engaged with a stationary collar member 82 that is fastened to an upstanding bracket member 77a on workpiece feed slide 77. The forward end of the feed tube 81 slidably engages a guide bushing 83 supported at the upper end of the upstanding member 80 on slide 70. The interior bore of the tube 81 is sized to telescope over the input end of the machining arbor 25 as seen in phantom in Figure 7 to feed or load a workpiece gear W onto the arbor 25.

The workpieces W are preferably oriented in the hopper 20 before dropping into the chute 21 by a conventional vibratory orientor so that the workpiece may be easily loaded on the arbor 25. A bottoming stop member or cradle 21a is provided at the end of the chute 21 to aid in guiding the workpieces W onto the arbor 25. It is understood that the bore of the workpiece gears will be substantially aligned with the end of the arbor when the workpieces are positioned in the crade 21a. The very input end of the arbor 25 may be slightly tapered to facilitate the sliding of a workpiece thereon if desired. The workpiece feed tube 81 may be adjusted by the threaded end 81a to vary the distance of telescopic advancement over the arbor to accommodate workpieces varying in thickness. It is only necessary to feed the workpiece onto the arbor 25 until the machining wheels 22, 23 and 24 completely engage it.

A spring loaded abutting rod 84 advances with the workpiece feed tube 81 until it abuts against the input end of the arbor 25. The abutting rod is of size substantially identical with the arbor 25, and is provided with an equal number of longitudinal grooves 84a which accurately align with the grooves 25c of the arbor 25.

This abutting rod 84 carries a plurality of circumferentially spaced radially extending members 84b at an intermediate point for engaging one end of a coil spring 85. The radially extending members 84b are slidably received within the enlarged end 81a of the workpiece tube 81 and the spring 85 encircles the abutting rod 84 within that enlarged section 81a. A removable retainer 86 is received over the enlarged end 81a of the workpiece tube 81 to bottom the other end of the spring 85. Thus, as the feed tube 81 telescopes over the end of the arbor 25, the abutting rod 84 is spring biased into end to end abutment with the arbor.

To advance the abrasive elements along the grooves 25c of the machining arbor 25 and in effect expand them therein, an abrasive push rod 87 is axially slidable along each of the grooves 84a of the abutting rod 84 by an abrasive feed slide 88. The slide 88 is provided with an upstanding boss 88a for slidably guiding the rear end of the abutting rod 84. The slide 88 is reciprocably mounted by a conventional dovetail slide arrangement, as indicated by the numeral 89, on the workpiece feed slide 77. A double acting hydraulic cylinder 90 is mounted within the slide 88 and carries a piston rod 90a that is suitably attached to the workpiece feed slide 77 for actuation of the slide 88.

A laterally extending securing member 87a is provided at the end of each pusher rod 87 adjacent the abrasive feed slide 88 to be suitably secured to the upstanding portion 88a of the slide 88. Securing each pusher rod to the slide 88 prevents rotational movement of the abutting rod 84 as well as permitting the slide 88 to function as a pusher member for the pusher rods 87. The very free ends of the pusher rods 87 may be slightly tapered to facilitate easy ingress into the grooves 25c of the arbor 25, and it is noted that the inner wall of the workpiece feed tube 81 functions to hold the pusher rods 87 in their corresponding grooves as well as to guide the pusher rods in the grooves 25c of the arbor 25.

When the abrasive pusher moves in, it effects a duplex honing action on the workpiece bore including a longitudinal movement and rotational movement.

Electro-hydraulic control system and operation of the machining apparatus

As above stated, the operation of the instant machining apparatus is controlled by an electro-hydraulic system, wherein the feed mechanism 17 automatically continues feeding of workpieces to the machining mechanism 16 and continues to urge the abrasive along the gradually shallower grooves of the arbor 25 until additional supplies of abrasive are needed.

Figure 10:
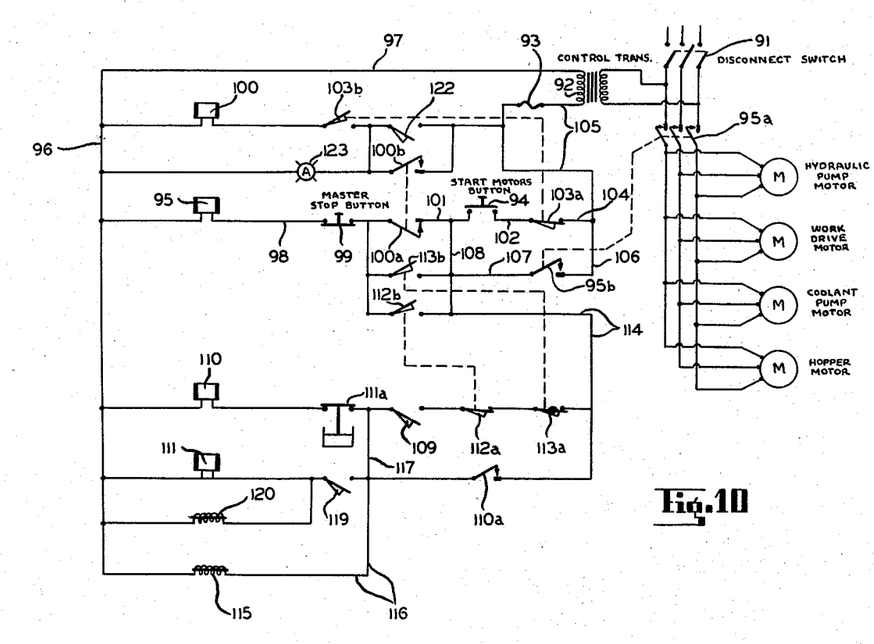
Figure 10 is a schematic view of the electrical control circuit in accordance with the invention for controling the machining apparatus.

Referring particularly to Figure 9 and the electrical schematic diagram of Figure 10, the operator manually closes the disconnect switch 91 thereby supplying power to the control transformer 92. The transformer 92 is fused as indicated at 93.

The operator then presses a start button 94 which will energize a relay 95 by connecting same to the transformer through a pair of conductor 96 and 97 on one side, and a conductor 98, a stop button 99, a normally closed relay contact 100a, a conductor 101, start button 94, a conductor 102, normally open but initially closed contacts 103a of a limit switch 103 (on the base 15, Fig. 9), a conductor 104, and a return conductor 105.

The energization of relay 95 closes mechanically interlocked switches 95a and 95b. Switch 95a starts all of the motors as indicated in Figure 10, while switch 95b will close a control circuit to keep coil 95 energized when the start button 94 is released. In this regard, it is seen that the contacts 103a and the start button 94 are bypassed by a conductor 106, switch 95b, a conductor 107, and a conductor 108 which connects with the conductor 101 leading to switch 100a.

The slide 70 is then manually advanced by manipulation of the hand wheel 74 until the abutment 75 engages the abutment 76. The slide 70 will then take the position as substantially shown in Figure 9, wherein the abutment plate 75 engages an actuating rod of a normally open micro-switch 109 to close the same. Also, an abutting plate 103c attached to the slide 70 leaves the limit switch 103 that is mounted on the base 15 to open the contacts 103a and close the contacts 103b, these contacts being mechanically interlocked.

Closing of the limit switch 109 energizes a relay 110 through conductors 96 and 97 on one side, and through normally closed contacts 111a of a timer relay 111, limit switch 109, through normally closed contacts 112a of a limit switch 112, normally closed contacts 113a of a limit switch 113, a conductor 114, the conductors 108 and 107, the closed contacts 95b of relay 95, and conductors 106 and 105. The energizing of relay 110 closes contacts 110a.

The closing of limit switch 109 also energizes a solenoid 115 of a hydraulic control valve which causes pressurized hydraulic fluid to be fed to the hydraulic cylinder 79 thereby causing slide 77 to move towards the upstanding portion 80 of slide 70 and advance the workpiece feed tube 81, thereby engaging a workpiece gear W in the cradle of the magazine chute 21 and load the workpiece onto the input end of the arbor 25. The hydraulic control valve may be of any suitable type but preferably a balanced four-way solenoid operated valve of a conventional type. It is noted that the solenoid 115, during energization, is connected to one side of the control transformer through conductors 96 and 97, and to the other side through a conductor 116, a conductor 117, to the limit switch 109 and onto the transformer as already described. Moreover, it is noted that a closing of normally open contacts 110a of the relay 110 bypasses the limit switch 109, and the limit switches 112 and 113.

Upon the forward movement of the workpiece feed slide 77, a switch actuating member 118 mounted thereon leaves the limit switch 112 to actuate the mechanically interlocked contacts 112a and 112b, by opening the former and closing the latter. And as already explained, contacts 110a will hold the relay 110 and solenoid 115 energized. When the slide 77 reaches the inward limiting position, the actuating member 118 closes the normally open limit switch 119, thereby energizing a solenoid 120 of a second hydraulic control valve which actuates the hydraulic cylinder 90 in one direction. This causes the abrasive feed slide 88 to move forward in the direction of the upstanding portion 90 of slide 77 thereby advancing the push rods for feeding the abrading elements within the grooves 25c of decreasing depth in the machining arbor 25. The hydraulic control valve associated with the solenoid 120 is also preferably of a four-way solenoid operated valve type.

The closing of normally open limit switch 119 also energizes the relay 111 for starting the timing period for feeding the abrasives. At the end of the preset timing interval, the contacts 111a will open deenergizing relay 110 causing its contacts 110a to open. The time delay relay contacts 111a may be of any suitable type, such as a dashpot type.

Upon the forward movement of the abrasive feed slide 88, a switch actuating member 121 mounted thereon leaves the limit switch 113 to actuate the mechanically interlocked contacts 113a and 113b, opening the former, while closing the latter. And since the workpiece feed slide 77 is forward, the limit switch 112 opens the contacts 112a, and the circuit, to the solenoids 115 and 120, the time delay relay coil 111, and the relay coil 110, is broken. The solenoids 115 and 120 of their corresponding hydraulic control valves will shift by spring pressure to cause the slides 77 and 88 to return to the starting position when the slides attain the starting position, the respective switch engaging members 118 and 121 will respectfully actuate limit switches 112 and 113 to close contacts 112a and 113a for again energizing relay 110 and repeating the steps of advancing the workpiece feed slide 77 and the abrasive feed slide 88 to load another workpiece gear onto the machining arbor and to feed the abrasive along the arbor grooves. Thus, it is seen that the loading of the workpiece gears and the feeding of the abrasive is automatic after the machine is initially started.

After repeated cycles of operation have sufficiently worn the abrading elements in the arbor grooves and when the abrasive feeding slide 88 advances forwardly to the point where the switch actuating member 121 may engage and actuate a limit switch 122, circuit connections are energized to indicate the necessity for replacing abrasive elements in the arbor grooves. The relay 100 will be energized through the now closed contacts 103b of limit switch 103 because the slide 70 is forward. Interlocking relay contacts 100a and 100b will now respectively open and close to bypass the limit switch 122 and light the amber light 123. It is noted that the relay 100 and the light 123 will remain energized after the slides 77 and 88 have returned to their starting position opening the limit switch 122, and further that the relay 95 will be deenergized by the opening of the contacts 100a of the relay 100 thereby opening relay contacts 95a and 95b to stop all of the driving motors of the machining apparatus. However, it is noted that the relay 95 will not be deenergized until the slides 77 and 88 have returned to their starting positions to engage the limit switches 112 and 113 and open contacts 112b and 113b.

Obviously, if the operator would desire to stop the machining apparatus at a particular time for any reason, it is only necessary to depress the master stop button 99 which will deenergize the coil 95 and open the contacts 95a and 95b, thereby stopping all of the operating motors.

The amber indicating light 123 will continue to be deenergized until the main slide 70 is manually returned by the wheel 74 out of operating position so that the switch engaging member 103c mounted on the slide 70 will engage the limit switch 103 mounted on the base 15 which will deenergize the relay coil 100 to open the contacts 100b and close the contacts 100a. Thus, the machine will be ready for further operation upon further insertion of abrading elements in the arbor grooves and when the foregoing steps of advancing the main slide into operating position has been commenced.

It may be noted that the limit switches 112 and 119 are adjustably mounted on a portion of the main slide 70, that the limit switches 113 and 122 are adjustably mounted on the portion of the workpiece feed slide 77, and that the abutting member 75 and the switch actuating member 103c are adjustably supported on a vertical base of the main slide 70, and that the abutment block 76 and limit switch 109 are adjustably mounted on the base 15. Hence, if it is desired to pre-set the feeding mechanism for any particular type of operation, the latitude of adjustment of the various limit switches permits such to be accomplished.

The limit switch 103 functions as a safety feature, where one operator may be operating the machine and upon being called away actuates the hand wheel 74 to retract the main limit switch 109, but not enough to engage the limit switch 103. Another operator may approach the machine to commence operation but should not do so unless the warning light 123 is off and the machining apparatus is at rest. Now the machine cannot be started again until the limit switch 103 has been contacted. Thus, while partial movement of the slide 70 will open the limit switch 109 the machining apparatus connot be started again until the limit switch 103 is engaged or until the slide 70 is retracted to its fullest position. If no abrasive elements have been inserted in the grooved arbor and the machine is started, the limit switch 122 will be closed immediately upon the advancement of the abrasive feed slide 88 to its forward position. Then the warning or indicating light 123 will be energized to inform the operator of the need of abrasives. Even if abrasives are inserted in the grooved arbor 25, before starting, it is necessary to return the main slide 70 to its rearward most position so that the actuating switch member 103c engages the safety limit switch 103.

Briefly, in the operation of the machine, the workpiece gear W finds its way to the bottom of the magazine chute 21, where the workpiece feed tube 81 moves inwardly carrying the workpiece gear W onto the center tool or arbor 25 and into engagement with the rotating machining wheels 22, 23 and 24. With the slide 77 having advanced the feed tube 81 to a predetermined position, this has caused the spring loaded abutting rod 84 to be received within the tube 81 thereby collapsing spring 85. While the workpiece feed slide 77 holds this position, the abrasive feed slide 88 moves inwardly carrying the push rods 87 into engagement with the abrasives in the arbor grooves 25c to in effect cause expansion of the abrasives within the workpiece bores. At a predetermined interval, the slides 77 and 88 withdraw to permit the following workpiece gear to drop into loading position and the cycle is then repeated. As the workpieces progress axially along the arbor 25, they come into contact with the ejection assembly which discharges the workpieces from the machining apparatus. At such time when the abrading elements in the arbor grooves need replacement, the slide 70 is moved outwardly by means of the actuating hand wheel 74 and new abrading elements are inserted in the arbor grooves 25c.

It is then seen that the instant invention provides a substantially completely automatic workpiece machining apparatus, especially suitable for concentricizing the pitch circle with the center bore of gear workpieces in a single operation.

It will be understood that modifications and variations may be effected without departing from the scope of the novel concepts of the present invention, but it is understood that this application is to be limited only by the scope of the appended claims.

I claim as my invention:

1. A machine for simultaneously performing machining operations on the tooth flanks and bore of a gear to concentricize the gear bore with the pitch circle which comprises a plurality of gear shaped machining wheels having parallel axes in equiarcuate alignment, a stationary floating abrasive loaded arbor extending at an equal distance between the axes of said wheels for receiving a gear, longitudinal grooves along said arbor having abrasive therein, and means for loading a gear on said arbor, said machining wheels being of such a structure as to advance said gears, wherein said wheels machine the tooth flanks while the abrasive loaded arbor machines the gear bore during the travel of said gears on said arbor.

2. A machine for simultaneously performing machining operations on the tooth flanks and bore of a gear to concentricize the gear bore with the pitch circle which comprises a plurality of spiral toothed gear shaped machining wheels having parallel axes in equiarcuate alignment for performing machining operations on the tooth flanks, a substantially stationary floating arbor extending at an equal distance between the axes of said wheels for slidably receiving a plurality of gears therealong, a plurality of longitudinal grooves along said arbor having an abrasive therein, said machining wheels being of such a structure as to advance said gears, and means for driving at least one of the wheels whereby said wheels rotate the gears and advance them along the arbor.

3. A gear grinding machine for simultaneously performing machining operations on the tooth flanks and bore of a gear workpiece to concentricize the gear bore with the pitch circle which comprises a plurality of grinding wheels of gear shape having parallel axes in equiarcuate alignment for performing machining operations on the tooth flanks, a floating substantially stationary arbor extending between the axes of said wheels and at an equal distance between the axes of said wheels for slidably receiving a plurality of gears therealong, a plurality of circumferentially spaced longitudinally extending grooves on said arbor, an abrasive received in said grooves, said grooves gradually decreasing in depth from the input end to the output end of said arbor, means for intermittently advancing the abrasive towards the shallow ends of the grooves, said wheels having a structure suitable for advancing said gears on the arbor and means for driving at least one of the wheels whereby said wheels rotate the gears and advance them along the arbor.

4. A machine for simultaneously performing machining operations on the tooth-flanks and bore of a gear to concentricize the gear bore with the pitch circle which comprises a plurality of machining wheels of gear shape having parallel axes in equiarcuate alignment for performing machining operations on the tooth flanks of a gear, a floating substantially stationary arbor extending between the axes of said wheels and at an equal distance between the axes of said wheels for receiving a plurality of gears therealong, a plurality of circumferentially spaced longitudinally extending grooves on said arbor, said grooves decreasing in depth from the input end of said arbor to the output end thereof, an abrasive received by said grooves, means for periodically loading a gear on said arbor, means for intermittently advancing the abrasive along the arbor grooves, said wheels having a structure for advancing said gear on the arbor, and means for driving at least one of the wheels whereby said wheels simultaneously rotate the gears about the arbor and advance them therealong for machining the center bore.

5. A machine for simultaneously performing machining operations on the tooth-flanks and bore of a gear to concentricize the gear bore with the pitch circle which comprises a plurality of gear shape machining wheels having parallel axes in equiarcuate alignment for performing machining operation on the tooth-flanks of a gear, a floating substantially stationary arbor having a straight working portion extending between the axes of said wheels and at an equal distance from the axes thereof and a second straight portion perpendicular to said first straight portion and connected by a curved section, an ejection means coacting with said second straight section to discharge the machined gears from the machine, a plurality of circumferentially spaced longitudinally extending grooves along the working portion of said arbor decreasing in depth from the input end to the output end thereof, an abrasive received by said grooves, means for periodically loading a gear on the input end of said arbor, means for intermittently advancing the abrasive along the arbor grooves, and means for driving at least one of the machining wheels whereby the structure of said wheels simultaneously rotate the gears about the arbor and advance them therealong for machining the gear bore.

6. A machine for simultaneously performing machining operations on the tooth-flanks and bore of a gear to concentricize the gear bore with the pitch circle which comprises a stationary base, a plurality of gear shape machining wheels having parallel axes in equiarcuate alignment and rotatably supported by said base, a substantially stationary floating arbor extending between the axes of said wheels and at an equal distance therefrom for receiving a plurality of gears therealong, a plurality of circumferentially spaced longitudinally extending grooves on said arbor, said grooves decreasing in depth from the input end of the arbor to the output end thereof, an abrasive received by said grooves, means for positioning a gear with its center bore substantially in registry with the input end of the arbor, a slide mechanism for loading the positioned gear on the arbor, means on said slide mechanism for advancing the abrasive along the arbor grooves, and means for driving at least one of said wheels whereby the structure of said wheels concurrently rotate the gears about the arbor and advance them therealong thereby causing simultaneous machining operations to be performed on the tooth-flanks and bore of the gears.

7. A machine for simultaneously performing machining operations on the tooth-flanks and bore of a gear to concentricize the gear bore with the pitch circle which comprises a stationary base, a plurality of gear shaped machining wheels having parallel axes in equiarcuate alignment and rotatably supported by said base, a substantially stationary floating arbor extending between the axes of said wheels and at an equal distance therefrom for receiving a plurality of gears therealong, a plurality of circumferentially spaced longitudinally extending grooves on said arbor, said grooves decreasing in depth from the input end of the arbor to the output end thereof, an abrasive received by said grooves, means for positioning a gear with its center bore in substantial registry with the input end of the arbor, a mechanism for automatically feeding gears to said arbor and advancing the abrasive along the arbor grooves, and means for driving at least one of said wheels whereby the structure of said wheels concurrently rotate the gears about the arbor and advance them therealong thereby causing simultaneous machining operations to be performed on the tooth-flanks and bore of the gears.

8. A machine for simultaneously performing machining operations on the tooth-flanks and bore of a gear to concentricize the gear bore with the pitch circle which comprises a stationary base, a plurality of machining wheels of gear configuration having parallel axes in equiarcuate alignment and rotatably supported by said base, a floating arbor extending between the axes of said wheels and at an equal distance therefrom for receiving a plurality of gears therealong, a plurality of circumferentially spaced longitudinally extending grooves decreasing in depth from the input end of the arbor to the output end thereof, an abrasive received by said grooves, means for positioning a gear with its center bore in substantial registry with the input end of the arbor, a mechanism for automatically feeding gears to said arbor and advancing the abrasive along the arbor grooves including a main slide supported for initially positioning the mechanism in operative position, a second slide movable on said main slide for feeding gears to said arbor, and a third slide mounted on said second slide for advancing the abrasive along the arbor grooves, and means for driving at least one of said wheels embodying structure for advancing said gears whereby said wheels concurrently rotate the gears about the arbor and advance them therealong thereby causing simultaneous machining operations to be performed on the tooth-flanks and bore of the gears.

9. A machine for simultaneously performing machining operations on the tooth-flanks and bore of a gear to concentricize the gear bore with the pitch circle which comprises a stationary base, a plurality of machining wheels of gear configuration having parallel axes in equiarcuate alignment and rotatably supported by said base, a floating arbor extending between the axes of said wheels and at an equal distance therefrom for receiving a plurality of gears therealong, a plurality of circumferentially spaced longitudinally extending grooves on said arbor, said grooves decreasing in depth from the input end of the arbor to the output end thereof, an abrasive received by said grooves, means for positioning a gear with its center bore in substantial alignment with the input end of the arbor, said wheels embodying structure for advancing said gears, means for driving at least one of said wheels whereby said wheels concurrently rotate the gears about the arbor and advance them therealong thereby causing simultaneous machining operations to be performed on the tooth-flanks and bore of the gears, and a mechanism for automatically feeding a gear to said arbor at predetermined intervals and for intermittently advancing the abrasive along the arbor grooves including a plurality of coacting slide assemblies and an electrohydraulic means for controlling said slides.

10. A machine for simultaneously performing machining operations on the tooth-flanks and bore of a gear to concentricize the gear bore with the pitch circle which comprises a stationary base, a plurality of machining wheels of gear configuration having parallel axes in equiarcuate alignment and rotatably supported by said base, a floating arbor extending between the axes of said wheels and at an equal distance therefrom for receiving a plurality of gears therealong, a plurality of circumferentially spaced longitudinally extending grooves on said arbor, said grooves decreasing in depth from the input end of the arbor to the output end thereof, an abrasive received by said grooves, means for positioning a gear with its center bore in substantial registry with the input end of the arbor, said wheels embodying structure for advancing said gears, means for driving at least one of said wheels whereby said wheels concurrently rotate the gears about the arbor and advance them therealong thereby causing simultaneous machining operation to be performed on the tooth-flanks and bore of a gear, and an assembly for automatically feeding a gear to said arbor at predetermined intervals and for intermittently advancing the abrasive along the grooved arbor including a manually actuated first slide mechanism for initially positioning the assembly in operative position, a hydraulically operated second slide mechanism mounted on said first slide for feeding gears to said arbor, a hydraulically operated third slide movably mounted on said second slide for advancing the abrasive along the arbor, and an electrical circuit for automatically actuating said hydraulically operated slide mechanisms.

11. In a device for simultaneously machining the tooth-flanks and bore of a gear having a plurality of machining wheels of gear configuration in equiarcuate alignment with parallel axes and a floating machining arbor extending between the axes of said wheels and at an equal distance therefrom, means for driving at least one of said wheels, a gear feeding mechanism comprising means for positioning a gear with its center bore in substantial alignment with said arbor, a manually actuable slide for initially positioning said mechanism in operative position, a hydraulically actuated slide for transferring the gears from said positioning means to said arbor, said latter slide automatically actuated by an electro-mechanical system and said wheels embodying structure for advancing the gears along said arbor.

12. In a device for simultaneously machining the tooth-flanks and bore of a gear having a plurality of machining wheels of gear configuration in equiarcuate alignment with parallel axes and a floating abrasive-carrying arbor extending between the axes of said wheels and at an equal distance therefrom, means for driving at least one of said wheels, a plurality of circumferentially spaced longitudinally extending grooves on said arbor, an abrasive received by said grooves on said arbor, a mechanism for feeding a gear to said arbor at predetermined intervals, a mechanism for intermittently expanding the abrasive on said arbor, electro-hydraulic means for automatically and synchronously actuating said mechanisms and said wheels embodying structure for advancing said gears along said arbor.

13. In a device for simultaneously machining the tooth-flanks and bore of a gear having a plurality of machining wheels of gear configuration in equiarcuate alignment with parallel axes and a floating abrasive-carrying arbor extending between the axes of said wheels and at an equal distance therefrom, said wheels embodying structure for advancing said gear along said arbor, means for driving at least one of said wheels, a plurality of circumferential spaced longitudinally extending grooves on said arbor, said grooves decreasing in depth from the input end of the arbor to the output end thereof, an abrasive received by said grooves, a mechanism for feeding a gear to said arbor at predetermined intervals, a mechanism for intermittently expanding the abrasive on said arbor, and electro-hydraulic means for automatically and synchronously actuating said mechanisms.

14. A gear grinding machine for simultaneously performing machining operations on the tooth-flanks and bore of a gear workpiece to concentricize the gear bore with the pitch circle which comprises a plurality of grinding wheels of gear configuration having parallel axes in equiarcuate alignment for performing machining operations on the tooth-flanks, said wheels having spiral gear teeth for engaging the teeth of a gear workpiece, a floating arbor extending between the axes of said wheels and at an equal distance therefrom for slidably receiving a plurality of gears therealong, a plurality of circumferentially spaced longitudinally extending grooves on said arbor, an abrasive received in said grooves, said grooves gradually decreasing in depth from the input end to the output end of said arbor, means for intermittently advancing the abrasive towards the shallow ends of the grooves, said wheels embodying structure for advancing said gear workpieces, and means for driving at least one of the wheels whereby said wheels rotate the gears and advance them along the arbor.

15. A gear grinding machine for simultaneously performing machining operations on the tooth-flanks and bore of a gear workpiece to concentricize the gear bore with the pitch circle which comprises a plurality of grinding wheels of gear configuration having parallel axes in equiarcuate alignment for performing machining operations on the tooth-flanks, said wheels having gear teeth for engaging a gear type workpiece, a floating arbor extending between the axes of said wheels and at an equal distance therefrom for slidably receiving a plurality of gears therealong, a plurality of circumferentially spaced longitudinally extending grooves on said arbor, an abrasive received in said grooves, said grooves gradually decreasing in depth from the input end to the output end of said arbor, means for intermittently advancing the abrasive towards the shallow ends of the grooves, said wheels embodying structure for advancing said gears, and means for driving at least one of the wheels whereby said wheels rotate the gears and advance them along the arbor.

16. An apparatus for machining gear type workpieces comprising a base, a machining mechanism supported on said base, a hopper and chute assembly for orienting the workpieces relative to said machining mechanism, a feeding mechanism slidably supported on said base for automatically feeding successive workpieces to said machining mechanism, said machining mechanism embodying a plurality of grinding wheels of gear configuration and triangularly aligned, a floating arbor extending between the axes of said wheels and at an equal distance therefrom, said wheels embodying structure to advance said gear type workpieces along said arbor and an ejection assembly for receiving the machined workpieces from said machining mechanism and discharging them from the apparatus, and electro-hydraulic means for automatically operating said apparatus.

17. A grinding machine comprising a plurality of spiral toothed triangularly arranged gear shaped, rotative, power driven grinding members of considerable axial length, an abrasive loaded stationary arbor extending an equal distance between the axes of said members, means for loading workpieces on the arbor while said members are being rotated, said spiral toothed members advancing the workpieces on said arbor and removing said workpieces from the rear end of said arbor.

18. A machine comprising a plurality of equiarcuately arranged gear shaped, rotative machining wheels having parallel axes, an abrasive carrying substantially stationary arbor extending an equal distance between the axes of said wheels, means for delivering workpieces to said arbor while said wheels are being rotated and said wheels being power driven and of such a structure as to advance the workpieces on the arbor.

19. A machine comprising a plurality of rotating machining wheels having parallel axes, an abrasive carrying stationary arbor extending between the axes of said wheels, means for intermittently loading workpieces on said arbor while said wheels are being rotated, one of said wheels being power driven, and said wheels being spirally toothed in the form of gears and of such structure as to advance the workpieces on said arbor.

20. A machine comprising a plurality of rotatably supported machine wheels, said wheels being equiarcuately arranged and having parallel axes, a floating substantially stationary arbor centered in the space within the axes of said wheels and carrying an abrasive, means for loading a plurality of centrally bored workpieces on said arbor, one of said wheels being power driven, and said wheels being spirally toothed in the form of gears and of such structure as to advance the workpieces on said arbor, whereby machining operations may be simultaneously performed by the machining wheels and the arbor.

21. An apparatus for machining centrally bored gears comprising a plurality of rotating spiral toothed gear shaped machining members, said members having parallel axes extending through a cylindrical plane, a stationary supporting member running at an equal distance between the axes of said rotating members for supporting a gear by its central bore, abrasive means carried by said supporting member, means for loading a gear on said supporting member, and said rotating machining members being of such a structure as to advance said gears, whereby the rotating members advance a plurality of gears along the supporting member and both said supporting member and said rotating members simultaneously perform a machining operation on the gears.

22. A machine for concentrically machining the tooth-flanks with the center bore of a gear which comprises a plurality of equiarcuately arranged gear shaped machining wheels, having parallel axes, means for driving at least one of said wheels, a substantially stationary floating center tool extending at an equal distance between the axes of the wheels, said center tool being provided with an abrasive for machining the center bore of a gear, and means for loading a gear on said center tool, said wheels being of such a structure as to advance said gear, whereby said wheels perform a machining operation on the gears mounted upon the center tool and rotate the gears around the center tool and advance them therealong wherein the center tool simultaneously performs a machining operation on the center bores of the gears.

23. The method of concentricizing the pitch circle and center bore of a gear, which includes the simultaneous operations: rotating the gear about an axis, advancing the gear axially along said axis, machining the tooth-flanks of the gear concentrically to said axis and simultaneously at a plurality of spaced points about the outside periphery of the gear, and abrading the center bore of the gear concentrically to said axis and at a plurality of circumferentially spaced points simultaneously.

References Cited in the file of this patent

UNITED STATES PATENTS

| | | |
|---|---|---|
| 1,111,064 | Gudmand-Hoyer | Sept. 22, 1914 |
| 1,658,899 | Hoke | Feb. 14, 1928 |
| 1,842,375 | Einstein | Jan. 26, 1932 |
| 1,915,749 | Mullen et al. | June 27, 1933 |
| 1,940,188 | Schweickardt | Dec. 19, 1933 |
| 2,076,601 | Strong | Apr. 13, 1937 |
| 2,105,896 | Stubbs | Jan. 18, 1938 |
| 2,497,076 | Ferguson | Feb. 14, 1950 |
| 2,552,284 | Klomp | May 8, 1951 |